May 25, 1937.   H. H. GREENE   2,081,665
WEIGHT AND LINE INDICATOR
Filed Dec. 31, 1934    3 Sheets-Sheet 1
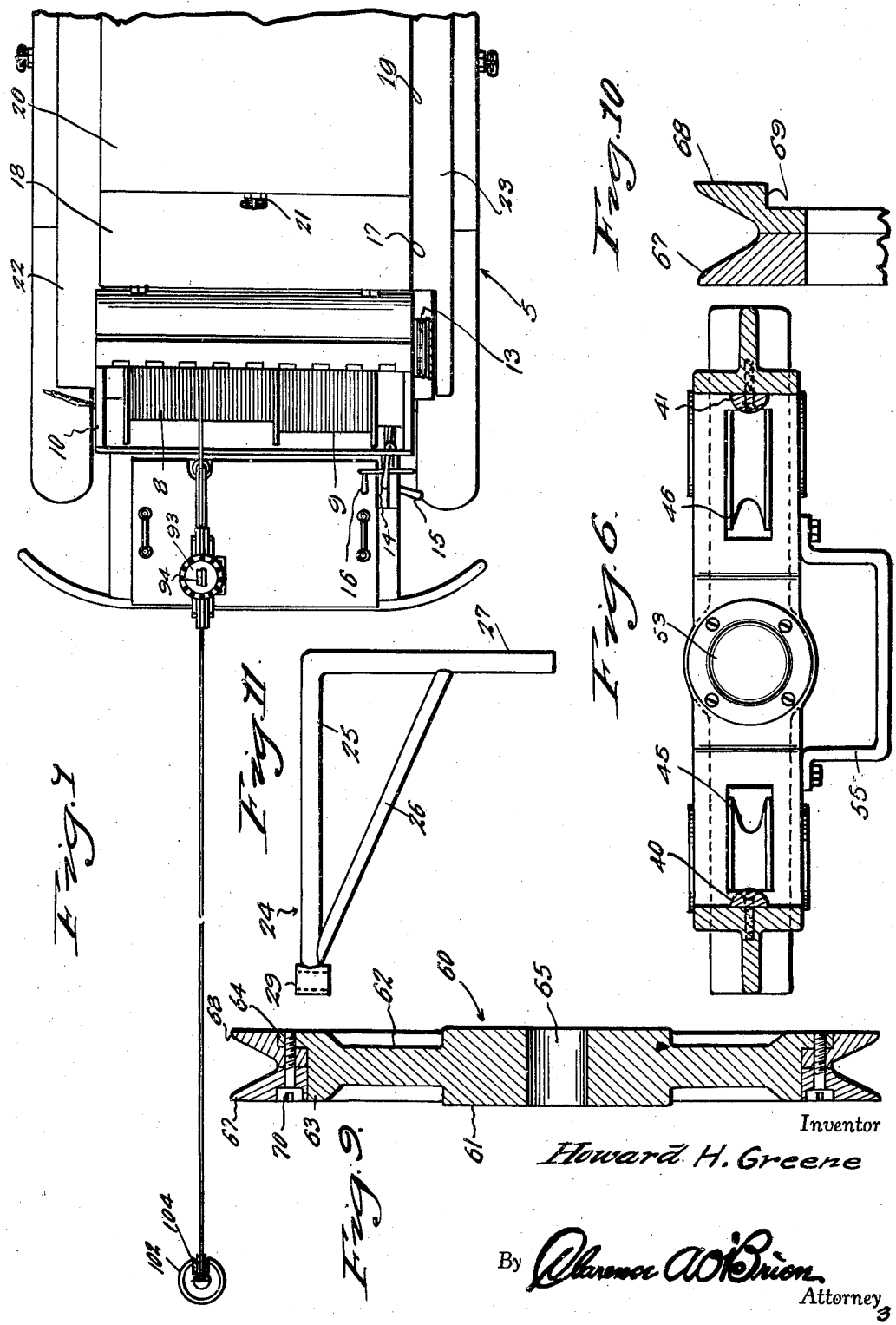
Inventor
Howard H. Greene
By Clarence A. O'Brien
Attorney May 25, 1937. H. H. GREENE 2,081,665
WEIGHT AND LINE INDICATOR
Filed Dec. 31, 1934 3 Sheets-Sheet 2
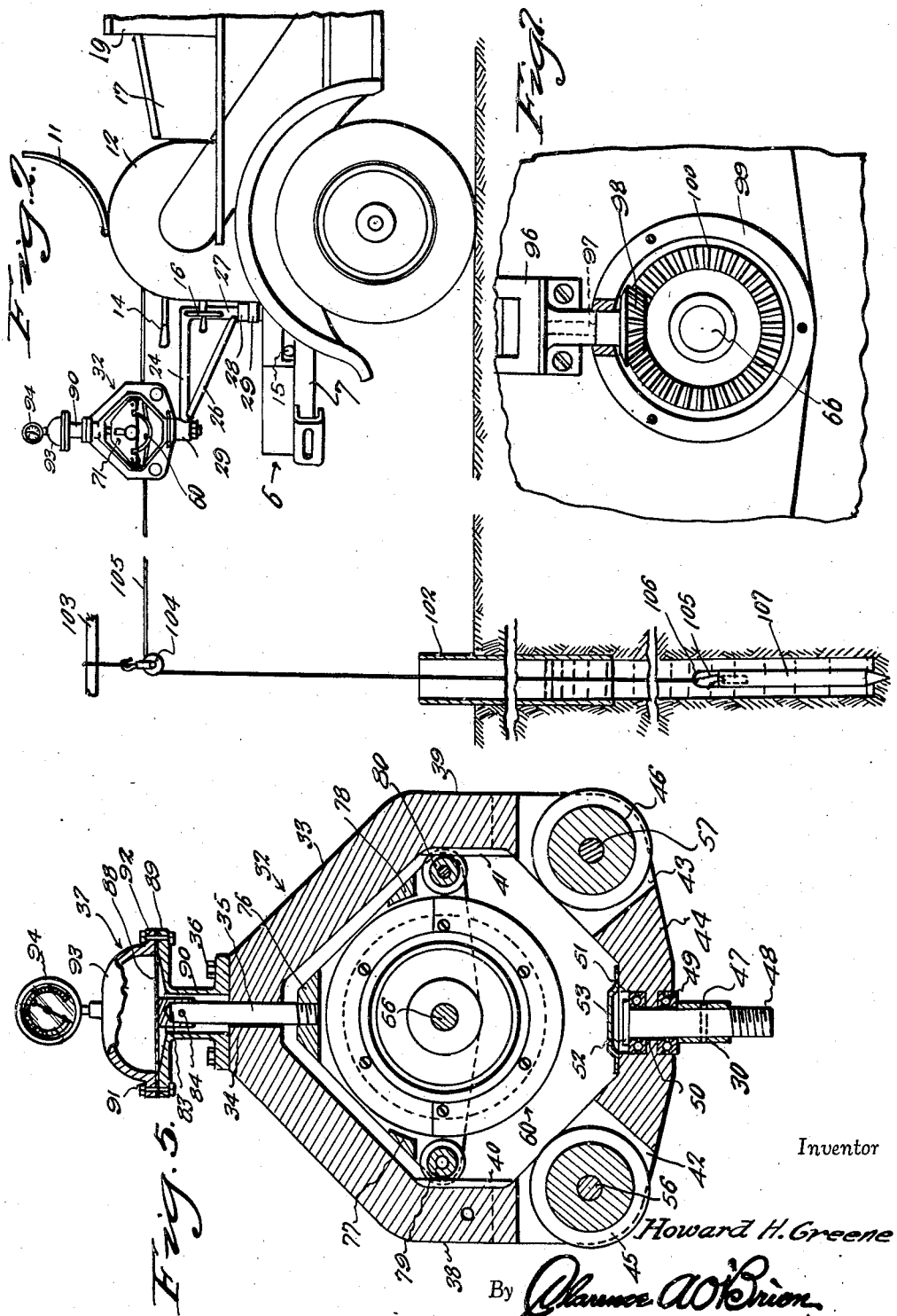
Inventor
Howard H. Greene
By Clarence A. O'Brien
Attorney May 25, 1937.  H. H. GREENE  2,081,665
WEIGHT AND LINE INDICATOR
Filed Dec. 31, 1934   3 Sheets-Sheet 3
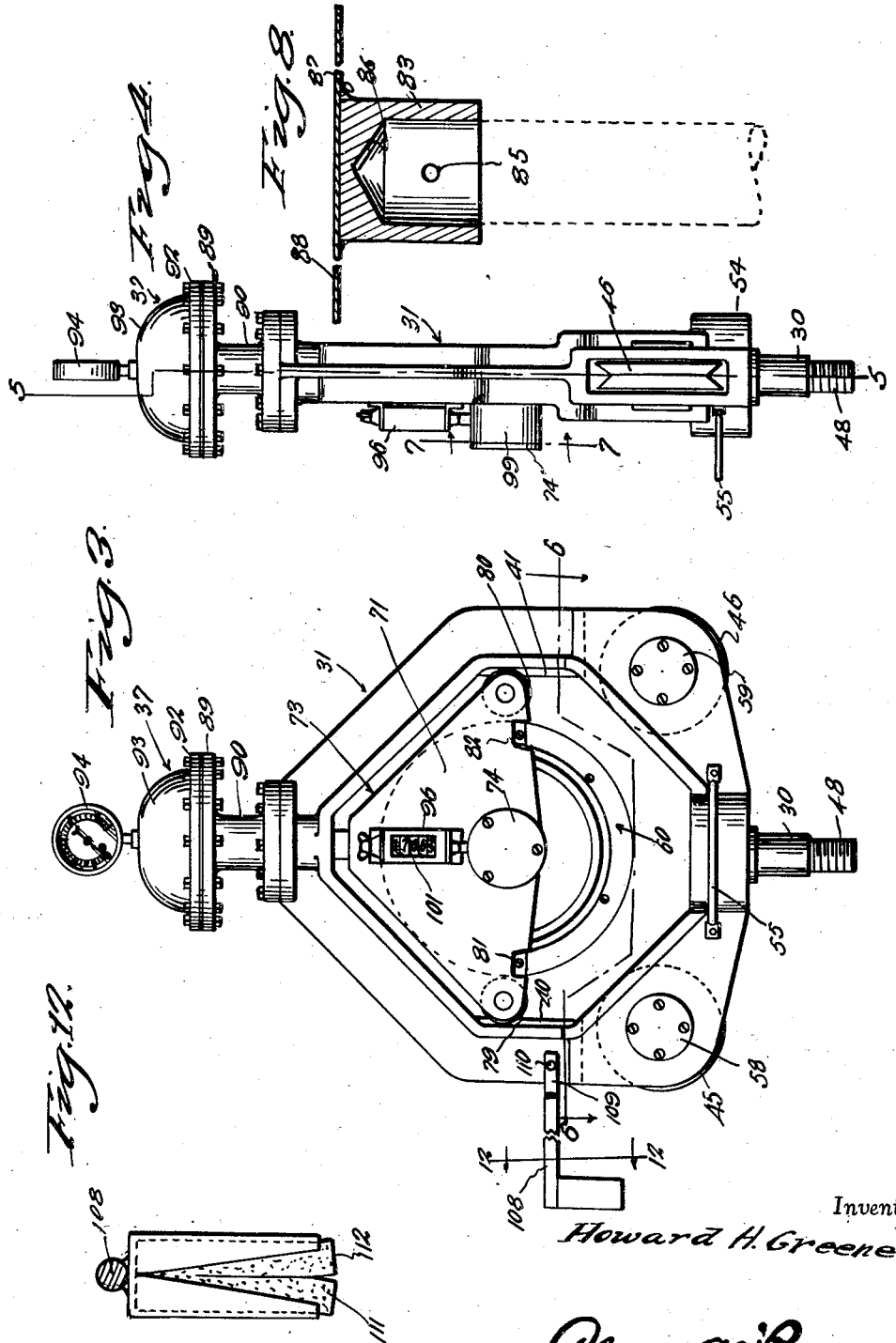
Inventor
Howard H. Greene
By Clarence A. O'Brien
Attorney Patented May 25, 1937

2,081,665

UNITED STATES PATENT OFFICE 2,081,665

WEIGHT AND LINE INDICATOR

Howard H. Greene, Oklahoma City, Okla.

Application December 31, 1934, Serial No. 760,058

3 Claims. (Cl. 265—1.6)

My invention relates generally to oil well drilling and operating and particularly to a novel weight and line indicator arrangement, whereby the work is facilitated, made more accurate and dependable, and is relieved of a considerable amount of danger.

Another important object of my invention is to provide an arrangement comprising a vehicle, such as an automobile, which is especially constructed and equipped for the purpose, and includes the indicating device, supporting the same in a position of new and unexpected utility, and enabling performing all of the line operations by a single operator stationed at the vehicle rather than in a dangerous position at the head of the well, whereby the services of a man at the well may be dispensed with without in any way sacrificing the efficiency of the operations.

Another important object of my invention is to provide a weight and line indicator per se which is more perfect mechanically, is more sensitive and accurate, and more easily handled and operated than other types of weight and line indicators, and which is not subject to the comparatively rapid wear in other weight and line indicators which requires frequent repairing thereof, to maintain the maximum efficiency thereof.

Another important object of my invention is to provide the wheel of the indicator with removable flanges, enabling replacement of the flanges to correct the diameter of the wheel to compensate for wear and other damage to the groove of the wheel.

Other objects and advantages of my invention will be apparent from a reading of the following description in connection with the drawings, wherein for purposes of illustration I have shown a preferred embodiment of my invention.

In the drawings:—

Figure 1 is a top plan view of a complete embodiment of the invention showing a vehicle mounted weight and line indicator gauging an insulated cable or line which is shown running over a pulley suspended over a well head.

Figure 2 is a side elevational view taken from the bottom of Figure 1 and looking upwardly and having a portion of the ground shown in section to disclose the relation of the torpedo in the well which is suspended by the line or cable.

Figure 3 is a side elevaltonal view of the weight and line indicator per se.

Figure 4 is an edge elevational view of Figure 3 taken from the right thereof.

Figure 5 is a longitudinal sectional view taken through Figure 4 approximately on the line 5—5.

Figure 6 is a horizontal sectional view taken through Figure 3 approximately on the line 6—6 and looking downwardly in the direction of the arrows.

Figure 7 is a vertical longitudinal sectional view taken through Figure 4 approximately on the line 7—7 and looking toward the right in the direction of the arrows.

Figure 8 is a transverse vertical sectional view taken through the diaphragm socket.

Figure 9 is a transverse vertical sectional view through the wheel showing the mounting of the removable sectional flanges thereof.

Figure 10 is a transverse vertical sectional view showing the flanges removed.

Figure 11 is a side elevational view of the mounting bracket.

Figure 12 is a transverse vertical sectional view taken through the line wiper and approximately on the line 12—12 of Figure 3 and looking toward the left in the direction of the arrows.

Referring to the drawings in detail, the numeral 5 generally designates a suitable vehicle preferably an automobile truck on the rear of which is arranged a platform 6 in the nature of a covered box which is supported on the frame extensions 7 to the rear of the reels or drums 8 and 9, respectively, which are housed by the casing 10 having the upwardly swingable cover 11 in its rounded top 12. The drum 8 carries the insulated electric cable, while the drum 9 carries the regular steel cable. The drums are arranged to be driven by the engine of the vehicle through a suitable chain or other transmission means 13 which is releasably engageable with the drums in a selective manner by means of the clutch control handle 14 and the throttle control handle 15, whereby the operator, who may also be the operator of the truck, is enabled to control the drums and all of the operations of the invention from a position adjacent the rear of the truck. A rotary handle 16 is provided to control a suitable brake for braking the drums as may be desired, all of these controls being grouped substantially in a single place and out of the way of the drums. Forwardly of the casing 12 is a box 17 which extends across the truck and is provided with a cover 18, to contain fuses or the like for the torpedoes while a larger box 19 provided with a hinged cover 20 is arranged to contain the nitroglycerine in ten quart containers, and covers 18 and 20 being so arranged that they may be closed by a single locking arrangement 21, including hasps on the several covers. Side or running board boxes 22 and 23 may be provided to carry the various tools and other devices used in the various operations.

A generally triangular bracket 24 composed of an L-shaped part 25 and a brace 26 between the extremities thereof has the standard portion 27 rotatably mounted in a vertical position in a vertical socket 28 which is strapped or clamped as indicated on the back part of the truck to the rear of the drum casing and toward one side thereof as indicated in Figure 1. The outer extremity of the horizontal part of the bracket is provided with a vertical sleeve 29 which receives the sleeve 30 on the weight and line indicator which is generally designated 31, whereby the weight and line indicator 31 is pivotally mounted on the bracket and capable of swinging toward one side or the other of the truck, according to the drum in use and the position of the cable thereon, the weight and line indicator being swung back and forth as may be required to accommodate these factors during the reeling or unwinding of either of the cables. The bracket 24 supports the weight and line indicator at a height which has been found to be most convenient and efficient.

The weight and line indicator per se, which is an improvement upon the weight and line indicator which is the subject matter of my co-pending application Serial No. 600,244, which was filed on March 21, 1932, of which the present application is a continuation in part, comprises the frame or body 32 whose upper part is inverted V-shaped in form as indicated at 33 and provided with the vertical opening 34 through which works the rod 35. Bolted as indicated at 36 to a flat part on the upper end of the frame or body is the hydraulic diaphragm housing which is generally designated 37.

Below the legs of the V-shaped portion 33 the frame has vertical parts 38, 39 on the inner side of which are removable runners 40 and 41 of generally semi-circular cross section. Below the portions 38 and 39 are the openings 42 and 43 which are similarly disposed in the base part 44 and in which the pulleys 45 and 46 are mounted.

The sleeve 30 before referred to as seated in the socket 29 of the bracket 24 has pinned thereto as indicated at 47 the bolt 48 which extends upwardly through the lower ball bearing structure 49 which is seated in an opening in the bottom of the base 44 and through the vertical opening 50 in the base, and through the second ball-bearing structure 51 above which it is provided with a flanged head 52 bearing on the top of the bearing 51. The flanged top 52 of the bolt is countersunk in the opening in which the upper bearing 51 is seated, and this opening forms a reservoir for lubricant which is confined and protected by a removable cover 53 which may be screwed in place on the top of the base 44, as particularly well shown in Figure 5. The base is circularly expanded and reinforced as indicated at 54 around the bolt construction, and a U-shaped handle 55 is attached to the flat sides of the left hand side of the base as shown in Figure 3 and also in Figure 4, the handle being formed and extended so as to lie outwardly of the extended portion 54 at that side of the base, the handle being provided to enable the operator standing at his station beside the controls at the rear of the truck, to pull the device back and forth as may be required.

In the pulley openings 42 and 43 there are disposed transverse axles 56 and 57, respectively, whose ends are mounted in suitable bearing structures confined by removable plates 58 and 59 at opposite sides which close openings receiving the bearings (not shown) and confine lubricant therein and prevent the ingress of dirt. The pulleys 45 and 46 are properly grooved and have their axes horizontally aligned and are adequately spaced to receive the line or cable thereover with the main wheel 60 lying on the line or cable portion which extends between the pulleys as indicated in Figure 2.

The main wheel 60 comprises the hub portion 61 from which radially emanates the thinner web 62 which has its radially outward part expanded on opposite sides as indicated at 63 and provided on one side with the radially outwardly extending flange 64. An axial opening 65 is provided for receiving the axle 66.

Two complemental removable flanges 67 and 68 are mounted on the periphery of the wheel, the flange 67 having the substantially triangular form shown in Figures 9 and 10 and the flange 68 having the generally triangular but mutilated form shown including the annular notch 69 which abuts the axial face and the radially outward face of the flange 64 which has threaded openings to receive the flange mounting bolts or screws 70 which pass through smooth accommodating openings in the flange 67 and threaded openings in the flange 68 to engage the threaded openings in the flange 64. By this arrangement a positive diameter and width of the groove defined by the removable flanges may be preserved with respect to the wheel 60 simply by replacing the flanges when they have become worn or otherwise mutilated, thereby preserving the proper mathematical relationship which is established by the diameter of the wheel, the cross section of the groove therein, the diameter of the cable used thereon, and the number of rotations made by the wheel, in conjunction with the hydraulic displacement of the hydraulic diaphragm device to be described.

The ends of the axle 66 which carries the wheel 60 are mounted in suitable ball-bearing structures (not shown) which are located in the side plates 71 and 72 of the vertically movable carriage 73, the necessary openings for the bearings being closed by removable plates 74 and 75 which also act as media for confining lubricant in the said bearings. The carriage may be cast in one piece and have the hollow generally triangular form indicated in the drawings forming a housing for the wheel as particularly well indicated in Figures 3 and 5 and include the webs 76, 77 and 78, respectively, which connect the side plates together. Between the side plates at the lateral extremities thereof are mounted the grooved guide wheels 79 and 80 whose grooves conform to the exterior contour of the guides 40 and 41 already mentioned. Just inwardly of the wheels 79 and 80 are the notches 81 and 82 which are arranged only in the side plate 71 for the purpose of exposing the screws 70 which connect the flanges 67 and 68 to the wheel, and thereby enable removal of the flanges without removing the wheel 60 from its place, each of the flanges being composed of a pair of half sections whose line of division is exposed by the notches 81 and 82 as indicated in Figure 3.

The carriage 73 has threaded into the apex web 76 thereof the lower end of the diaphragm operating rod 35 which works through the opening 34 in the top of the frame or body of the device as indicated in Figure 5, the upper end of the rod 35 being telescoped into the diaphragm socket 83 and traversed by a pivot pin 84 whose ends are seated in openings 85 in the sides of the socket, and the top of the socket is conically shaped as indicated at 86. The top of the socket is fastened by any suitable means such as soldering 87 to the bottom of a copper diaphragm 88 which is stretched across the top of the lower diaphragm casing section 89 which is circular in form and has its top concaved as indicated so as to leave a movement space below the diaphragm. Depending from the section 89 is the neck 90 which spacedly surrounds the socket 83 and the rod 35 and is secured by its flange by the bolts 36 to the top of the frame or body of the device.

Bolted to the section 89 as indicated at 91 by bolts which traverse the flange on the section 89, the diaphragm, and the flange 92 is the inverted cup-shaped dome 93 which contains a quantity of hydraulic fluid (not shown) and opens into the lower end of a pressure gauge 94. The diaphragm 88 is sufficiently stiff to suspend the carriage in an intermediate position but flexible enough to respond to extremely small changes in the up-push of the carriage 73 which result from changes in tension of the cable on which the wheel 60 is riding. This arrangement is much more sensitive and long lived than the arrangement shown in my co-pending application Serial No. 600,244 filed on March 21, 1932, and other similar constructions utilizing media which depend upon the durability of frictionally moving or otherwise engaging surfaces which are subject to comparatively rapid wear and proportional reduction in efficiency, requiring frequent replacement to maintain accuracy and maximum efficiency. The diaphragm 88 in the present arrangement is practically indestructible in service and for that reason continues for its life to transmit accurately the wheel pressures to the pressure gauge 94.

A revolution counter generally designated 96 is driven by a depending shaft 97 on which is arranged a beveled pinion 98 working in the circular housing 99 which is closed by the plate 74 on the left hand side of the device, the beveled pinion 98 engaging a beveled gear 100 which is fixed on the adjacent end of the shaft 66 on which the main wheel 60 is fastened, the counter being arranged to clearly exhibit through its window as indicated at 101.

In utilizing the device of the invention the truck is run to a point near the hole or the wellhead 102, that is, to a distance which is convenient and yet safe as regards proximity to the well head, and after a suitable support 103 having the pulley 104 has been arranged over the well, the appropriate cable 105 may be run over the pulley 104 as indicated in Figure 2, the cable having a suitable hook 105 engaged with the bail 106 of the torpedo or the like 107 so that as the torpedo strikes the bottom of the portion of the well being worked upon the hook will undo and enable the cable to be withdrawn and leave the torpedo in place.

The cable on the reel or drum 8 is of the insulated steel type which is used for firing the fuses in the well through establishing a circuit through the cable to the torpedo and through the well casing to the truck to which the cable drum is mounted, a suitable wire being run from the truck to the well casing or an open ground used. The all steel cable on the drum 9 may be utilized in the regular way and is used for lowering explosive elements into the well or for withdrawing the same, while the insulated cable is used chiefly for firing the torpedoes after location in the well.

A wiper rod 108 having a forked end 109 bolted as indicated at 110 to one edge of the body of the device suspends a pair of wiping arms 111 and 112 in a position outwardly of the adjacent edge of the device to receive therebetween and wipe the cable as it comes out of the well, as indicated in Figure 3.

Although I have shown and described herein a preferred embodiment of my invention, it is to be definitely understood that I do not desire to limit the application of the invention thereto, and any change or changes may be made in the materials, and in the structure and arrangement of the parts, within the spirit of the invention and the scope of the subjoined claims.

What is claimed is:—

1. In a weight and line indicator comprising a frame for mounting on a support, the upper portion of the frame being of an inverted V-shaped formation, a vertically movable carriage of triangular formation mounted in said frame and movable into said inverted V-shaped portion of the frame, a main wheel on said carriage, guide wheels on the lower corners of the carriage and being grooved in their periphery, said frame including legs depending from the lower extremities of the inverted V-shaped portion, runners on the inner side of the legs engageable by the grooved wheels mounted in the lower corners of the carriage, said legs having openings in their lower portions, supplementary wheels in said openings, said supplementary wheels being designed to carry a cable thereacross while said main wheel rests upon that portion of the cable which extends between the supplementary wheels, gauge means on the apex of the inverted V-shaped portion, and means operatively connecting the gauge with said carriage.

2. In a weight and line indicator comprising a frame for mounting on a support, the upper portion of the frame being of an inverted V-shaped formation, a vertically movable carriage of triangular formation mounted in said frame and movable into said inverted V-shaped portion of the frame, a main wheel on said carriage, guide wheels on the lower corners of the carriage and being grooved in their periphery, said frame including legs depending from the lower extremities of the inverted V-shaped portion, runners on the inner side of the legs engageable by the grooved wheels mounted in the lower corners of the carriage, said legs having openings in their lower portions, supplementary wheels in said openings, said supplementary wheels being designed to carry a cable thereacross while said main wheel rests upon that portion of the cable which extends between the supplementary wheels, gauge means on the apex of the inverted V-shaped portion, and means operatively connecting the gauge with said carriage, a bottom portion connecting the bottom ends of the legs and means depending therefrom whereby the frame may be supported.

3. In a weight and line indicator comprising a frame for mounting on a support, the upper portion of the frame being of an inverted V-shaped formation, a vertically movable carriage of triangular formation mounted in the frame and movable into said inverted V-shape portion of the frame, a main wheel on said carriage, guide wheels at the lower corners of said carriage, legs depending from the V-shape portion and forming part of the frame, runners mounted on the inner side of the legs engaged by the guide wheels, supplementary wheels on the frame, said supplementary wheels being designed to carry a cable thereacross while said main wheel rests upon that portion of the cable which extends between the supplementary wheels, a gauge on the apex of the inverted V-shape portion of the frame, and means operatively connecting the gauge with the carriage.

HOWARD H. GREENE.